Jan. 14, 1941.  E. AULIN  2,228,240
SOUND REPRODUCING DEVICE
Filed July 27, 1939
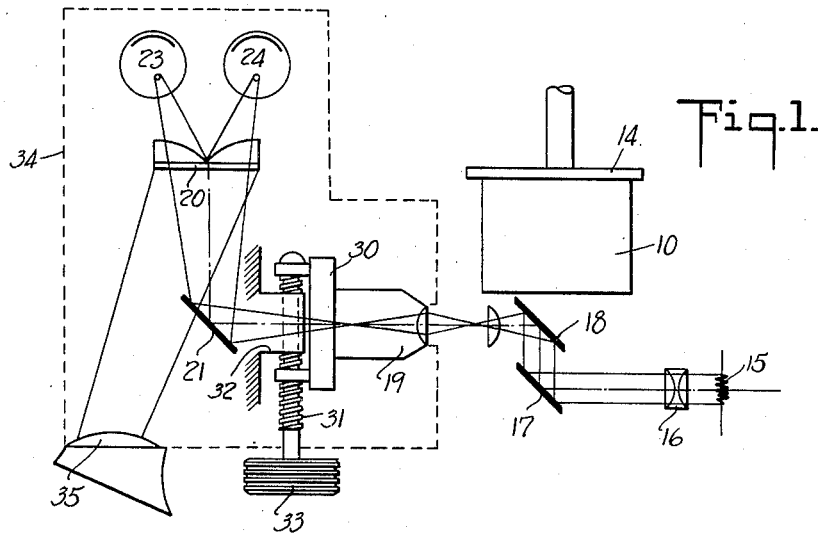
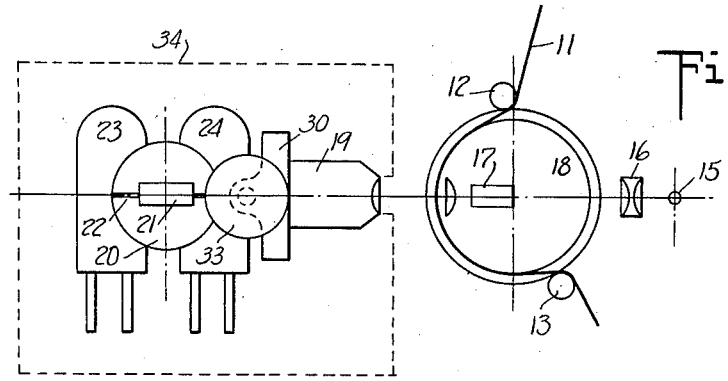
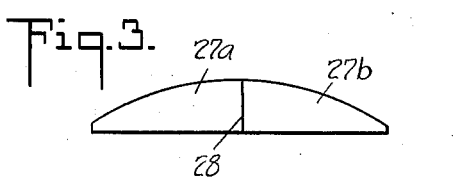
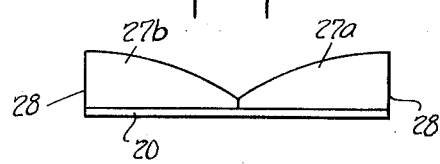
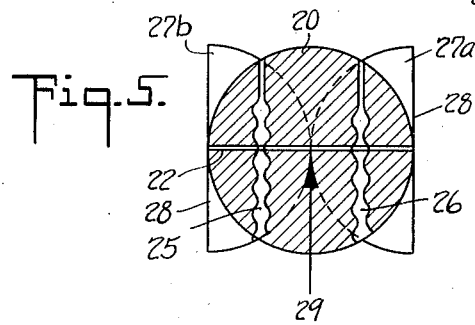

Patented Jan. 14, 1941

2,228,240

UNITED STATES PATENT OFFICE 2,228,240

SOUND REPRODUCING DEVICE

Evert Aulin, Lidingo, Sweden, assignor to Aga-Baltic Radio Aktiebolag, Stockholm, Sweden, a corporation of Sweden Application July 27, 1939, Serial No. 286,793
In Sweden July 28, 1938

8 Claims. (Cl. 179—100.3)

In sound film and similar recording of sound on a strip of material, there is usually a serious lack of space available for the recording. Choosing sound film as an example, it is known, that the dimensions of the film were standardized a long time before the conception of placing sound on the film. In order not to encroach too much upon the space, intended for the picture, it was necessary to make the sound track as narrow as possible.

The oldest films had but a single sound track, which was reproduced by means of a single photoelectric cell. However, it has later been proposed to replace the single sound track with two (or even more) sound tracks. Such films with at least two sound tracks may, for instance, be push-pull films, expansion films, stereophonic films and so forth. In certain cases it was, of course, possible to place one of the additional tracks outside the perforation of the film or in the perforation, but if this is done there is the risk that perforation faults cause disturbing sound, and therefore in spite of the above mentioned circumstances it has been preferred to divide the original sound track into two, or occasionally even into more, parallel tracks, each carrying its recording.

The film is hygromobil, that is, it swells and shrinks with moisture and heat, and if it is made of Celluloid or similar material as usually is the case, it is further subject to an ageing phenomenon, which is not yet explained but which results in a slow shrinking. Even with the greatest possible precision in the recording, the sound tracks may be slowly displaced in relation to the sound gates or photocells of the reproducing apparatus, so that one or the other of the photoelectric cells will be subjected to light radiation which is modulated fully or partially in accordance with the recording in that part of the sound track which does not correspond to the photoelectric cell. It has been attempted to eliminate this by separating the two partial tracks from each other by means of a black band, sufficiently wide, but this solution of the difficulties has not proved satisfactory because it reduces the width of the sound track available for the sound recording, and as the granulation of the film and other small faults exert a correspondingly greater influence, the sound quality is destroyed.

The present invention refers to an arrangement in the reproducing apparatus, by means of which the above mentioned difficulties are eliminated. According to the invention firstly one of the optical parts in the sound reproduction device is displaceable laterally in such a way that the image of the sound recording is displaced along the sound slit, and secondly an optical monitoring arrangement is provided in such a way that by means thereof a control of the position of the sound recording with respect to the slit is obtained, by means of which the correct position of said optical part may be assured in every different case. The greatest precision is obtained if the optical monitoring arrangement and the slit are united as one single optical part, so that the check image is thrown in the same optical plane in which the slit is arranged.

Further objects and advantages of my invention will be apparent from the following description, considered in connection with the accompanying drawing, which forms a part of the specification, and of which:

Fig. 1 is a more or less diagrammatical side view of an embodiment of my invention;

Fig. 2 is a top view of the device shown in Fig. 1;

Fig. 3 is a side view of a lens;

Fig. 4 is a side view of an optical monitoring disk; and

Fig. 5 shows how the image on the optical monitoring disk may appear in a certain case.

In Figs. 1 and 2, the roller, preferably driven by the film itself, on which the scanning point is situated, is designated 10. The film 11 (Fig. 2) is guided by means of guide rollers 12 and 13 along the surface of the roller 10, so that one edge of the film moves against a flange 14 on the roller 10, whereas the opposite edge projects outside the cylindrical surface of the roller 10 to such an extent that the beam of light for the sound reproducing may pass through the sound track of the film 11 without interference from the roller 10.

The beam of light is produced by an exciter lamp, schematically shown by the filament 15, and it is focused by means of lenses 16 against the sound track of the film. In order that the roller 10 shall not impede the light from reaching the film, an optical assembly, including two mirrors 17 and 18, or corresponding prisms are used in known manner. A second optical arrangement 19 serves for the projection of the illuminated part of the film on an optical monitoring disk 20. In order that the monitoring disk may be more easily visible to the operator, the beam of light is reflected angularly by means of an additional angular mirror 21.

In the monitoring disk 20 the slit 22 is arranged as shown in Fig. 5. The light beam passes through the slit to two photoelectric cells 23, 24, which produce alternating currents corresponding to the photographical registration on the film. The following parts, by which the alternating currents are amplified and reproduced as sound, are not part of the present invention. As a matter of fact they may be any kind suitable for reproduction of two different but cooperating sound tracks of which one is converted into electric oscillations by means of the photoelectric cell 23, and the other is converted into electric oscillations by means of the photoelectric cell 24.

The image of the illuminated part of the film 11 is thrown, as mentioned above, on the optical monitoring disk 20, and may there, for example, take the form which is shown in Fig. 5. In order that the part of the light, which emanates from one of the recordings 25, and passes the slit 22, shall fall upon one of the photoelectric cells 23, and that the part of the light which emanates from the other recording 26 and passes the slit 22, shall fall upon the other of the photoelectric cells 24, special means are provided in connection with the optical monitoring disk 20. A planoconvex lens (Fig. 3) is cut diagonally in two parts, 27a and 27b, respectively, which are in inverted positions mounted upon the optical monitoring disk 20, as shown in Fig. 4. The cut 28 between the half-lenses should be as near as possible perpendicular to the opening 22. The half-lenses 27a and 27b, respectively, function in a manner known per se, each functioning as a system of one deviating prism and one lens, the geometrical axis of the latter being arranged perpendicular to the slit 22. On the monitoring disk there is further arranged an index 29 exactly in front of the point of tangency between the two half-lenses 27a and 27b.

The recordings 25 and 26 differ from each other. If they are formed by the two recordings of a push-pull sound track, each forms one image of the sound oscillation, but they oscillate in opposite phase. There are also other possibilities. It is of importance that, even at maximal amplitude, the apexes of one recording may not interfere with the photoelectric cell of the other recording, or, in other words, the border line between the two recordings must exactly coincide with the point 29 of the monitoring disk. Normally this is not the case due to the above mentioned shrinking and swelling movement of the film material, and, for correction of these under guidance of the image produced on the monitoring disk, the following arrangement is made:

The lenses 19 are mounted on the guide-like arrangement 30 which by means of a setting screw 31 is combined with a wormed bushing 32, arranged in the housing. By turning the screw the lenses 19 are displaced laterally in such a direction that the picture on the monitoring disk is displaced in parallel with the opening 22. The direction of the thread of the screw 31 is preferably made in such a manner that turning the head of the screw to the right will displace the image on the monitoring disk to the right side and vice versa.

It is desired to protect the optical parts from outer disturbing light. Else the alternating current illumination in the room would, for instance, cause a tone, reproduced in the photoelectric cell. For this purpose, the arrangement is normally enclosed, as shown by the dashed line 34 in Figs. 1 and 2. In order that the operator may view the monitoring disk 20, a hooded opening 35 is provided in the housing 34, as shown in Fig. 1. For the sake of simplicity of illustration, this opening has been shown as provided at the side of the screw 33, though a more handy and suitable arrangement is to locate the opening so that the operator views the monitoring disk obliquely from above. The angle of spection, which with the arrangement according to Fig. 1 is rather oblique, may in such case be made more perpendicular, as the mirror 21, as seen in Fig. 2, has a smaller extension in vertical direction than in horizontal direction.

The arrangement of the monitoring disk 20 provides rather great difficulties as it must also contain the slit 22. In order that no light shall pass through other parts of the disk 20 than through the opening it has proved necessary to cover the disk with a material which is substantially opaque. It is preferable to use a metallic material. However, it is difficult to provide a sufficiently narrow opening in such material. This difficulty is solved, in accordance with the invention, by making the plate 20 of glass or similar material, a fine metallic string being stretched over its surface. The plate is thereafter placed in a vacuum-chamber, in which a metal, preferably aluminum, is heated to vaporization. The vapor thus formed condenses on the plate 20 and covers the plate as well as the string, which has been stretched over the plate. When the string is removed, there is left a slit on the plate not covered with metal, the width of which is equal to the thickness of the string. A plate, made in such a way, however, cannot be used as a monitoring disk without further treatment, as the plate is to a great extent reflecting, whereas a monitoring disk should have a diffusing surface.

However, this difficulty is solved according to the invention by using a glass-plate that, before the metal is applied, has been ground in some manner, known per se. The part covered with metal will thereby be diffusing, but also the slit will cause diffusion, which would cause the bundle of light from the mirror 21 to be spread in all directions, and part of the rays of light, intended for the photoelectric cell 23, would hit the photoelectric cell 24, at the same time as part of the rays of light, intended for the photoelectric cell 24 would hit the photoelectric cell 23. This disadvantage is, however, obviated by placing the side of the disk 20, to which the material is applied, against the half-lenses 27a and 27b, and these are cemented together with the disk 20 by means of some glass cement having the same refraction index as the glass, for example Canada-balsam. By careful cementing it is possible to fill all uneven surfaces in the glass which have caused its dull surface. The glass in the slit will hence appear clear, and the reflection from the other parts of the glass is eliminated.

By the above described arrangement it is thus possible for the operator to supervise the correct position of the sound track on the monitoring disk 20, and by means of the screw 33 to immediately correct any error in this position. Usually the material in one and the same film has shrunken or swelled to the same extent throughout all of the film, and for that reason it is sufficient if the operator immediately at the beginning of the first part of the film adjusts the position of the sound track. If, however, there should for any reason arise some displacement during the movement of the film through the reproduction apparatus, this is observed by the deterioration of the sound quality and also by reading the electrical instruments, which may be provided, and the operator can make the required adjustment.

The invention is of course not limited to the embodiment shown, but it may be modified in a plurality of manners without exceeding the scope of the invention.

Thus instead of displacement of the lenses 19, the photoelectric cells 23 and 24 may be displaced laterally, together with the monitoring disk 20. Also, there can be arranged a monitoring disk, separated from the disk containing the slit.

The scope of my invention is not to be limited by the embodiment shown for purposes of illustration, but is to be determined by the appended claims.

What I claim is:

1. In a device for reproducing sound photoelectrically from a plurality of parallel recordings, means providing a slit, optical means for focusing an image of said recordings at said slit, a plurality of photoelectric cells disposed so that each is illuminated by light passing through said slit from one of said recordings, at least one of said optical means being displaceable to displace said image along said slit, and means for adjusting said optical means and retaining it in adjusted position.

2. In a device for reproducing sound photoelectrically from a plurality of parallel recordings, means providing a slit, optical means for focusing an image of said recordings at said slit, a plurality of photoelectric cells disposed so that each is illuminated by light passing through said slit from one of said recordings, at least one of said optical means being displaceable to displace said image along said slit, means for adjusting said optical means and retaining it in adjusted position, and means for making the image at said slit visible.

3. In a device for reproducing sound photoelectrically from a plurality of parallel recordings, a monitoring disk provided with a light slit, optical means for focusing an image of said recordings on said disk, a plurality of photoelectric cells disposed so that each is illuminated by light passing through said slit from one of said recordings, at least one of said optical means being displaceable to displace said image along said slit, and means for adjusting said optical means and retaining it in adjusted position.

4. In a device for reproducing sound photoelectrically from a plurality of parallel recordings, a monitoring disk provided with a light slit, optical means for focusing an image of said recordings on said disk, a plurality of photoelectric cells disposed so that each is illuminated by light passing through said slit from one of said recordings, at least one of said optical means being displaceable to displace said picture along said slit, means on said monitoring disk for indicating the proper position of said image, and means for adjusting said optical means and retaining it in adjusted position.

5. In a device for reproducing sound photoelectrically from a plurality of parallel recordings, a monitoring disk provided with a light slit, optical means for focusing an image of said recordings on said disk, a plurality of photoelectric cells disposed so that each is illuminated by light passing through said slit from one of said recordings, at least one of said optical means being displaceable to displace said image along said slit, and a threaded member associated with said optical means whereby turning of said member to the right or left displaces said picture to the right or left, respectively, along said slit.

6. In a device for reproducing sound photoelectrically from a plurality of parallel recordings, a monitoring disk provided with a light slit, optical means for focusing an image of said recordings on said disk, a plurality of photoelectric cells disposed so that each is illuminated by light passing through said slit from one of said recordings, at least one of said optical means being displaceable to displace said image along said slit, means for adjusting said optical means and retaining it in adjusted position, means for enclosing said monitoring disk and optical means to prevent extraneous light from affecting them, and a hooded opening in the enclosing means whereby said monitoring disk may be viewed from outside said enclosing means.

7. In a device for reproducing sound photoelectrically from two parallel recordings, a monitoring disk having one side rough and coated with metal except for a narrow, smooth and clear line providing a light slit, optical means for focusing an image of said recordings on said disk, two photoelectric cells disposed so that each is illuminated by light passing through said slit from one of said recordings, at least one of said optical means being displaceable to displace said image along said slit, and means for adjusting said optical means and retaining it in adjusted position.

8. In a device for reproducing sound photoelectrically from two parallel recordings, a monitoring disk having one side rough and coated with metal except for a narrow, smooth and clear line providing a light slit, a pair of half-lenses joined back to back to the coated side of said disk by suitable glass cement, optical means for focusing an image of said recordings on said disk, two photoelectric cells disposed so that each is illuminated by light passing through said half-lenses from one of said recordings, at least one of said optical means being displaceable to displace said image along said slit, and means for adjusting said optical means and retaining it in adjusted position.

EVERT AULIN.